(12) United States Patent
Switzer et al.

(10) Patent No.: US 10,458,608 B2
(45) Date of Patent: *Oct. 29, 2019

(54) LED SOLAR SIMULATOR AND METHOD OF USE

(71) Applicant: Newport Corporation, Irvine, CA (US)

(72) Inventors: Greggory W. Switzer, Bozeman, MT (US); Todd A. McFarland, Bozeman, MT (US); Robert K. Buczala, Bozeman, MT (US); Paul E. Rishel, Bozeman, MT (US); Eugene W. Kuntz, Bozeman, MT (US)

(73) Assignee: Newport Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/154,669

(22) Filed: Oct. 8, 2018

(65) Prior Publication Data

US 2019/0049079 A1 Feb. 14, 2019

Related U.S. Application Data

(63) Continuation of application No. 15/025,261, filed on Mar. 25, 2016, now Pat. No. 10,094,524.

(51) Int. Cl.
*F21S 8/00* (2006.01)
*G01J 1/04* (2006.01)
*G02B 27/10* (2006.01)
*G01J 1/08* (2006.01)
*G02B 19/00* (2006.01)
(Continued)

(52) U.S. Cl.
CPC ............. *F21S 8/006* (2013.01); *G01J 1/0422* (2013.01); *G01J 1/0474* (2013.01); *G01J 1/08* (2013.01); *G02B 5/04* (2013.01); *G02B 5/1814* (2013.01); *G02B 5/32* (2013.01); *G02B 19/0066* (2013.01); *G02B 27/1086* (2013.01); *G02B 27/425* (2013.01); *G02B 27/4294* (2013.01); *H05B 37/0272* (2013.01); *G01J 2001/4252* (2013.01); *H05B 33/0863* (2013.01)

(58) Field of Classification Search
CPC ........ F21S 8/006; G01J 1/0422; G01J 1/0474; G01J 1/08; G01J 2001/4252; G02B 5/04; G02B 5/1814; G02B 5/32; G02B 19/0066; G02B 27/1086; H05B 33/0863; H05B 37/0272
See application file for complete search history.

(56) References Cited

U.S. PATENT DOCUMENTS 10,094,524 B2 * 10/2018 Switzer .................. F21S 8/006
2007/0030456 A1 2/2007 Duncan
(Continued)

FOREIGN PATENT DOCUMENTS

| EP | 2448006 A1 | 5/2012 |
| WO | 2009092056 A2 | 7/2009 |
| WO | 2012117363 A1 | 9/2012 |

*Primary Examiner* — Mary Ellen Bowman
(74) *Attorney, Agent, or Firm* — Brian F. Swienton; Edward Scott Trask

(57) ABSTRACT

The present application discloses a method of using a LED-based solar simulator light source having at least one LED array formed by multiple LED groups of LED assemblies, at least one field flattening device, at least one diffractive element, and at least one optical element configured to condition the broad spectrum light source output signal and direct the light source output signal to a work surface.

18 Claims, 10 Drawing Sheets

(51) Int. Cl.
    *H05B 37/02*     (2006.01)
    *G02B 5/32*     (2006.01)
    *G02B 5/18*     (2006.01)
    *G02B 5/04*     (2006.01)
    *G02B 27/42*     (2006.01)
    *G01J 1/42*     (2006.01)
    *H05B 33/08*     (2006.01)

(56) References Cited

U.S. PATENT DOCUMENTS

2011/0241549 A1     10/2011   Wootton
2011/0241719 A1     10/2011   Chin
2013/0134885 A1      5/2013   Linden \* cited by examiner

LED SOLAR SIMULATOR AND METHOD OF USE

CROSS REFERENCE TO RELATED APPLICATIONS

The present application claims priority to U.S. patent application Ser. No. 15/025,261, filed on Mar. 25, 2016, entitled "LED Solar Simulator and Method of Use," which is a national stage application of PCT Patent Application Serial No. PCT/US2014/057924, filed on Sep. 27, 2014, entitled "LED-Based Solar Simulator System and Method of Use," which claims priority to U.S. Provisional Patent Application Ser. No. 61/884,043, filed on Sep. 28, 2013, entitled "LED Solar Simulator and Method of Use," the entire contents of which are each incorporated by reference herein.

BACKGROUND

Solar simulators are used in a wide variety of applications. For example, light sources capable of reproducing the spectral characteristics of the sun are used in testing the weathering characteristics of various protective coatings, including the testing of paints, stains, exterior coatings, waxes, and the like. Further, solar simulators may be used in various medical research applications. For example, solar simulators are frequently used in research directed to skin cancer, photo-biological applications, photo toxicity, photo allergy testing, as well as various other medical applications. In addition, solar simulators are commonly used to determine the sun protection factor (hereinafter SPF) of various cosmetics, sun blocks, lotions, clothing, and the like. Typically, SPF testing examines erythemal response with and without a sun protection material applied to the skin of a mammal.

Presently, solar simulators commonly include high intensity lamps to provide an optical output to reproduce the spectral characteristics of the sun. While lamp-based solar simulator systems have proven somewhat useful in the past, a number of shortcomings have been identified. For example, often these systems require the use of optical filter systems to selectively tune the spectral output of the solar simulator to a desired wavelength range. These optical filter systems increase the cost and complexity of the solar simulator system. Further, numerous optical filters systems may be required to enable the solar simulator to output optical radiation in a variety of desired wavelength ranges. In addition, recent environmental regulations have severely limited or banned the use of some materials used in the manufacture of colored glass filters. As such, reproducing portions of the solar spectrum have become difficult if not impossible.

Thus, in light of the foregoing, there is an ongoing need for a solar simulator system capable of efficiently reproducing the solar spectrum. Moreover, ideally, the solar simulator would be capable of selectively reproducing portions of the solar spectrum.

SUMMARY

The present application is directed to a novel LED solar simulator system and method of use. In one embodiment, the present application discloses a method of reproducing the solar spectrum by providing an LED-based light source formed from at least one LED array formed by multiple LED groups of LED assemblies, activating at least one of the LED groups to output at least one optical signal within a discrete wavelength range, and combining the output optical signals from the multiple LED groups to produce at least one broad spectrum output signal using at least one diffractive element. The method also allows the user to selectively vary at least one characteristic of the broad spectrum light signal and direct the broad spectrum light signal to at least one work surface that can be illuminated by at least two alignment light signals. The user may adjust the position of LED light source until the alignment light signals intersect when the LED light source is located at a desired distance from the work surface.

In another embodiment, the present application is directed to a LED solar simulator system and method of reproducing the spectral characteristics of the sun by providing at least one LED-based light source formed from at least one LED array, the LED array formed from multiple LED groups of LED assemblies, activating at least one of the LED groups to output at least one optical signal within a discrete wavelength range, selectively controlling the output of each LED group with at least one control device in communication with the LED-based light source, thereby selectively varying the wavelength spectra of the output optical signal. The user may adjust the position of the LED light source relative to a work surface by using the output of two alignment light signals that may intersect when the LED light source is located a desired distance from the work surface.

Other features and advantages of the embodiments of the novel LED-based solar simulator system as disclosed herein will become apparent from a consideration of the following detailed description.

BRIEF DESCRIPTION OF THE DRAWINGS

Several embodiments of a novel LED-based solar simulator system will be explained in more detail by way of the accompanying drawings, wherein.

DETAILED DESCRIPTION

The present application is directed to various embodiment of a LED-based solar simulator. Unlike prior art lamp based solar simulators, the LED-based solar simulator described herein provides a low power LED light source capable of reproducing the spectral output of the sun. In addition, the LED-based solar simulator device described herein permits a user to easily change the spectral characteristics of the output signal as desired.

Figure 1:
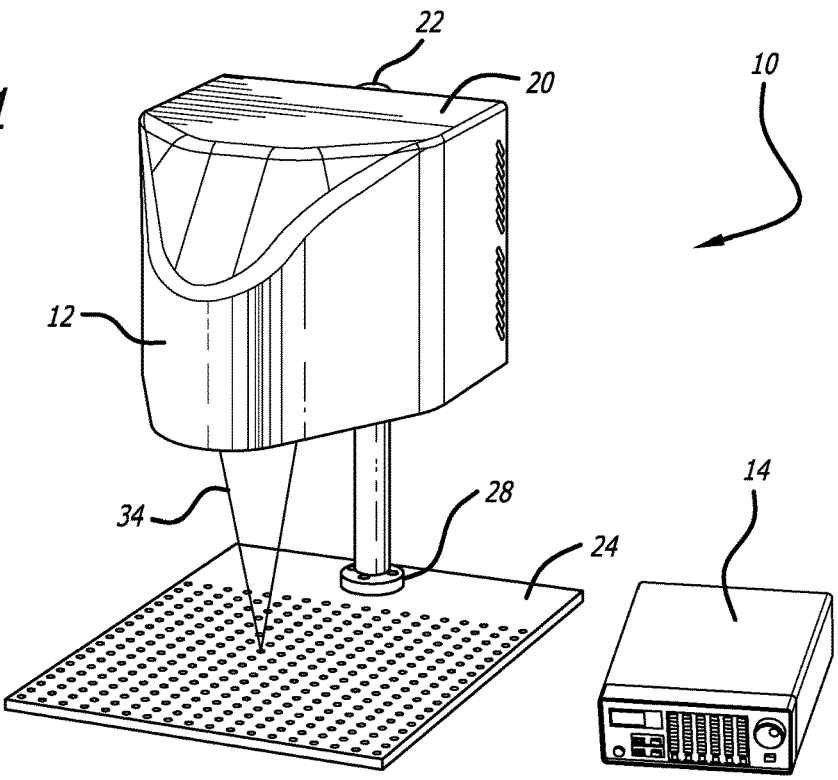
FIG. 1 shows an elevated frontal perspective view of an embodiment of an LED-based solar simulator system having a LED light source and control device.

FIG. 1 shows a perspective view of one embodiment of an LED-based solar simulator system. As shown, the LED-based solar simulator system 10 comprises at least one LED light source 12 and at least one control system or device 14. In one embodiment, the LED light source 12 coupled to the control device 14 via at least one conduit (not shown). In an alternate embodiment, the LED light source 12 may be coupled to the control device 14 wirelessly. In another embodiment, the LED light source 12 may be coupled to the control device 14 via a computer network. In one embodiment, at least one of the LED light source 12 and control device 14 includes at least one processor or similar controller therein. Optionally, at least one of the LED light source 12 and control device 14 may be in communication with at least one external processor or computer (not shown). As such, the LED light source 12 and control device 14 may be configured to communicate with the external processor or computer (not shown) via at least conduit and/or wirelessly. Further, the control device 14 could be included within or otherwise incorporated into the LED light source 12

Referring again to FIG. 1, in the illustrated embodiment, a single LED light source 12 is shown with a corresponding single control device 14. Optionally, multiple LED light sources 12 may be configured to couple to a single control device 14. For example the present system may be configured to have any number of LED light sources 12 coupled to any number of control devices 14.

FIGS. 1-5 show various views of an embodiment of the LED light source 12 shown in FIG. 1. As shown, the LED light source 12 includes at least one light source head housing 20 enclosing at least one light source head 50 (See FIG. 6). In one embodiment, the light source head housing 20 is manufactured from at least one thermoplastic material. In an alternate embodiment, the light source head housing 20 is manufactured from at least one polymer material. In another embodiment, the light source head housing 20 is manufactured from aluminum. Optionally, the light source head housing 20 may be manufactured from any variety of materials including, but not limited to, polymers, metals, alloys, composite materials, and the like.

Referring again to FIGS. 1-5, the light source head housing 20 is coupled to at least one head support 22. In the illustrated embodiment, the head support 22 is coupled to at least one work surface 24 using at least one coupling bracket 28. Optionally, the head support 22 and work surface 24 may be integral. In another embodiment, the light source head housing 20 and/or light source head 50 are configured to couple to utilize standard optical mounting hardware to couple at least one of the light source head housing 20 and light source head 50 to at least one of the head support 22, the work surface 24, or both.

Figure 4:
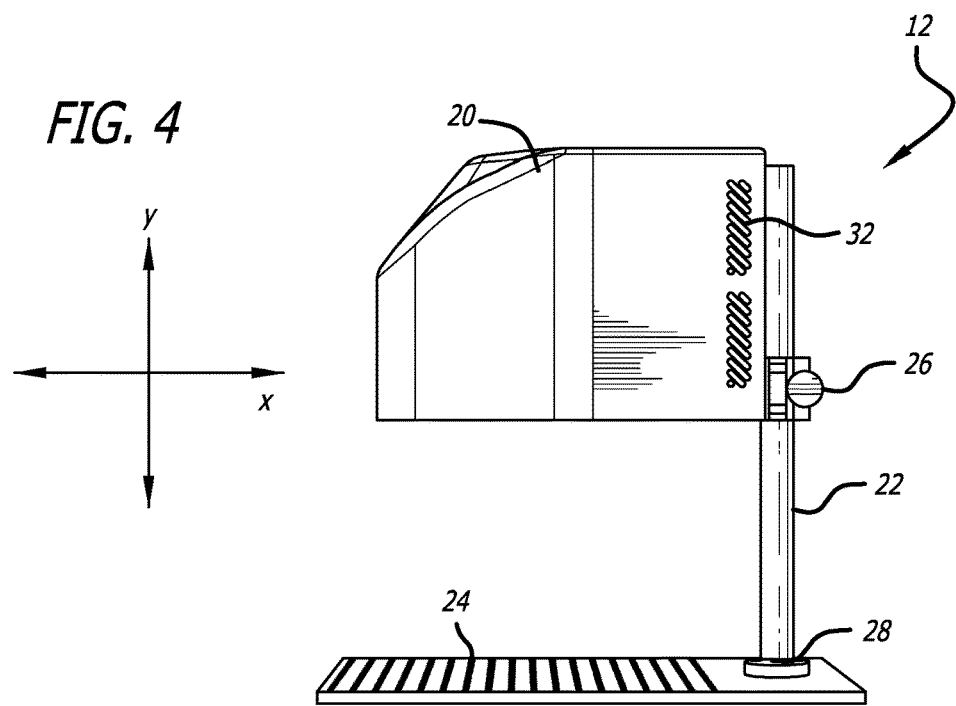
FIG. 4 shows a side planar view of an embodiment of a LED light source used in a LED-based solar simulator system.

In the illustrated embodiment, at least one coupling device 26 is used to couple the light source head 50 and/or light source head housing 20 to the head support 22. As such, in one embodiment the head support 22 and coupling device 26 are configured to permit the light source head housing 20 enclosing the light source head 50 to be movable on at least one plane. For example, as shown in FIG. 4, the light source head housing 20 housing the light source head 50 may be configured to be adjustably positioned along at least one of the x-axis and or the y-axis. Further, at least one of the head support 22 and coupling device 26 may include any number of degrees of freedom thereby permitting movement of the light source head housing 20 housing the light source head 50 along any number of planes and or orientations. In one embodiment, the head support 22 comprises an optical support rod while the coupling device comprises an optical rod clamp, both manufactured by the Newport Corporation. Optionally, the head support 22 and coupling device 26 may be fixed.

Figure 3:
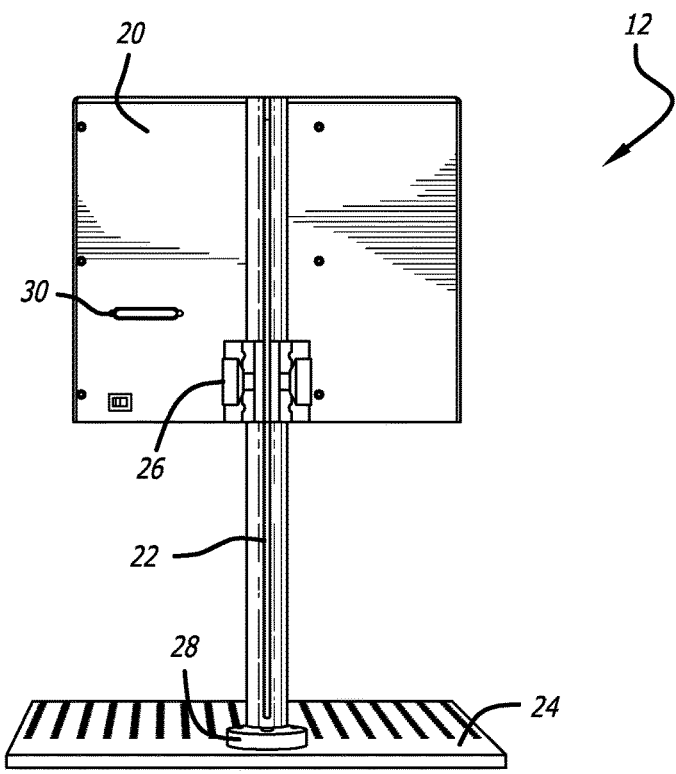
FIG. 3 shows a rear planar view of an embodiment of a LED light source used in a LED-based solar simulator system.

As shown in FIG. 3, in one embodiment one or more passage 30 configured to receive one or more coupling elements or electrical connectors may be formed in the light source head housing 20. For example, at least one passage 30 configured to receive at least one conduit or cable therein may be formed on the light source head housing 20 thereby permitting the LED light source 12 to be coupled to at least one of the control device 14 and or one or more external computer or processor (not shown). Optionally, light source head housing 20 may include multiple passages formed therein thereby enabling the light source head 50 (See FIG. 6) to be coupled to multiple devices and/or controllers.

Figure 2:
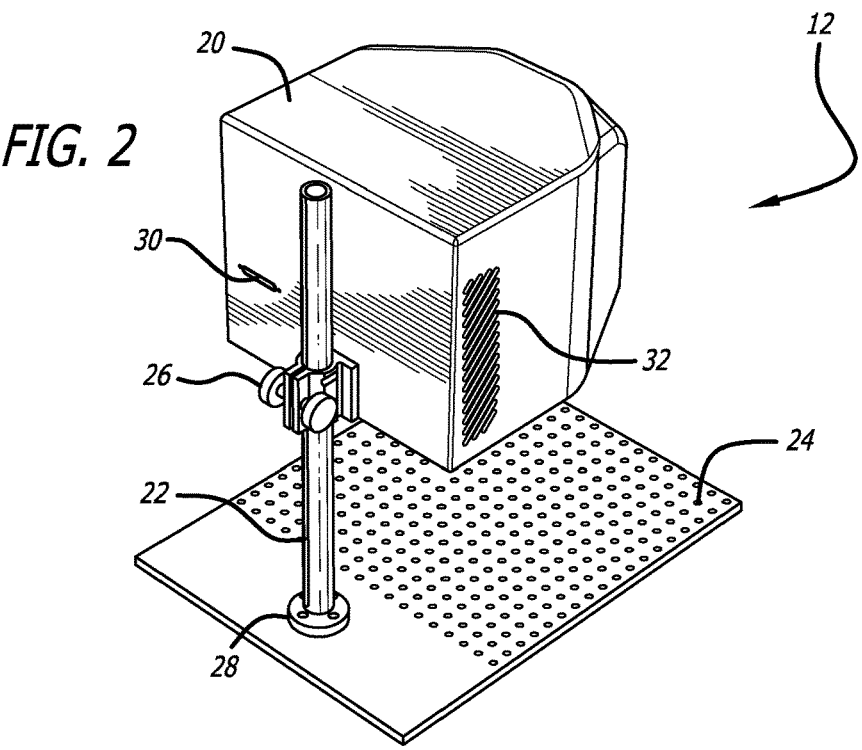
FIG. 2 shows an elevated rear perspective view of an embodiment of a LED light source used in a LED-based solar simulator system.

Referring to FIGS. 2 and 4, the light source head housing 20 may include any number of vents and/or fluid passages 32 therein. In the illustrated embodiment, fluid passages 32 are formed on opposing sides of the light source head housing 20, thereby permitting cooling of the components forming the light source head 50. Optionally, any number, size and shape of fluid passages 32 may be formed at any location on the light house head housing 20. In the illustrated embodiment, the fluid passages 32 are configured to permit the flow of air within the light source head housing 20. Optionally, the fluid passages 32 may be configured to permit the flow of any variety of fluids within the light source head housing 20, including liquid cooled configurations. In another embodiment, the light source head housing 20 is configured to include at least one cryogenic cooler therein thermal regulation of the components forming the light source head 50.

Figure 5:
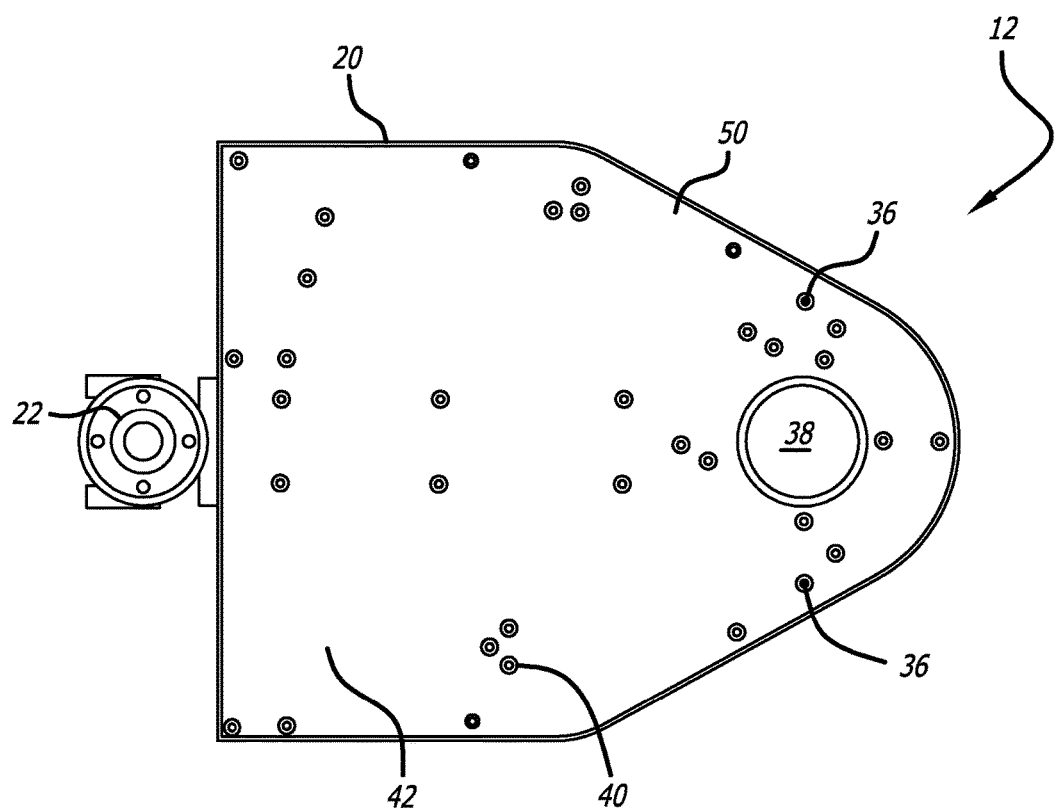
FIG. 5 shows an upward planar view of the bottom of an embodiment of a LED light source used in a LED-based solar simulator system.
Figure 6:
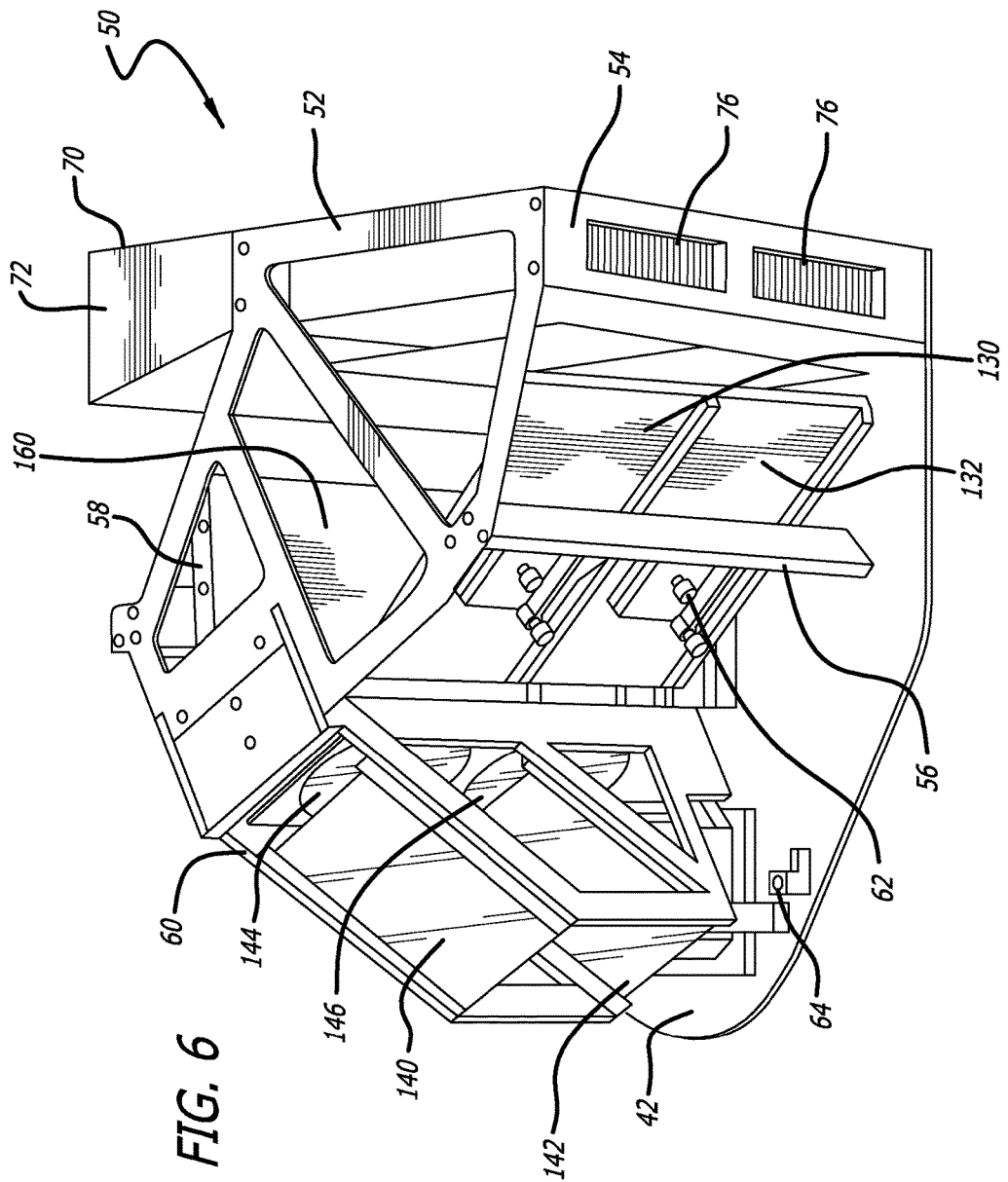
FIG. 6 shows an elevated perspective view of the internal components of an embodiment of a LED light source used in a LED-based solar simulator system.

FIGS. 1, 5, and 6 show various views of the LED light source 12. As shown, the light source head 50 includes at least one head base plate 42 having any number of apertures and/or orifices formed thereon. In the illustrated embodiment, the head base plate 42 is configured to detachably couple to the light source head housing 20. In an alternate embodiment, the head base plate 42 is configured to non-detachably couple to the light source head housing 20. Referring again to FIGS. 5 and 6, the head base plate 42 may include at least one alignment or positioning device aperture 36 formed therein. In the illustrated embodiment, two alignment device apertures 36 are formed on the head base plate 42.

As shown in FIGS. 1, 5, and 6, one or more alignment beams or signals 34 may be configured to be projected from the alignment apertures 36 to the work surface 24. For example, one or more alignment devices 64 may be configured to project at least one alignment signal 34 from the alignment device apertures 36 to the work surface 24. In the embodiment shown in FIG. 1, two intersecting alignment signals 34 are projected from the light source head 50 to the work surface 24. Optionally, the alignment signals 34 may project any number, shape, and/or size of alignment fiducials on the specimen, the work surface 24, and/or both. Optionally, the alignment apertures 36 may be used in conjunction with one or more cameras, machine-vision systems, and the like.

Referring again to FIGS. 1, 5, and 6, at least one projection aperture 38 is formed on the head base plate 42. In the illustrated embodiment, the projection aperture 38 may be sized to receive one or more lenses therein. Further, the head base plate 42 may include any number and size of fastener recesses 40 therein. In one embodiment, the fastener recesses 40 are configured to permit the components forming the light source head 50 to be securely coupled to the head base plate 42. In an alternate embodiment, the fastener recesses 40 are configured to permit one or more elements or devices to be coupled to the head base plate 50 proximate to the work surface 24. Exemplary devices include, without limitations, cameras, detectors, filters, shutters, choppers, splitters, prisms, light sources, and the like.

Figure 7:
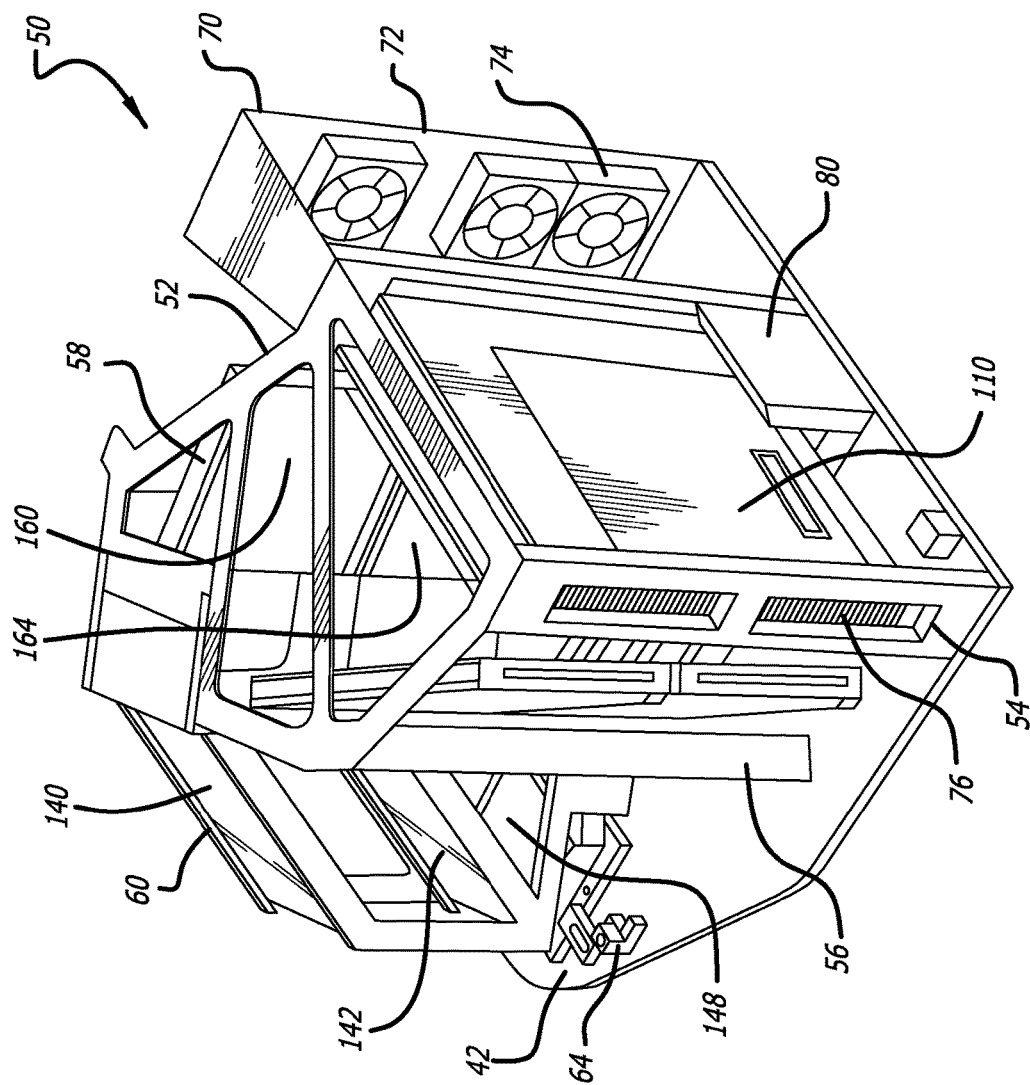
FIG. 7 shows another elevated perspective view of the internal components of an embodiment of a LED light source used in a LED-based solar simulator system.
Figure 9:
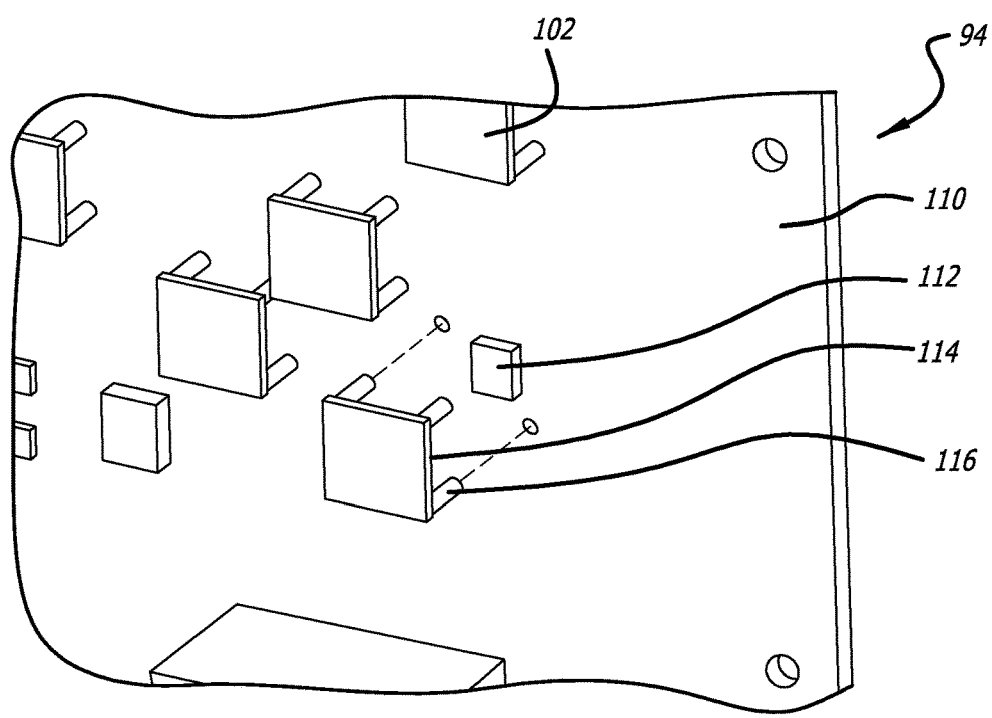
FIG. 9 shows an elevated side view of an LED assembly used to form a LED arrays used in an embodiment of a LED light source used in a LED-based solar simulator system.
Figure 10:
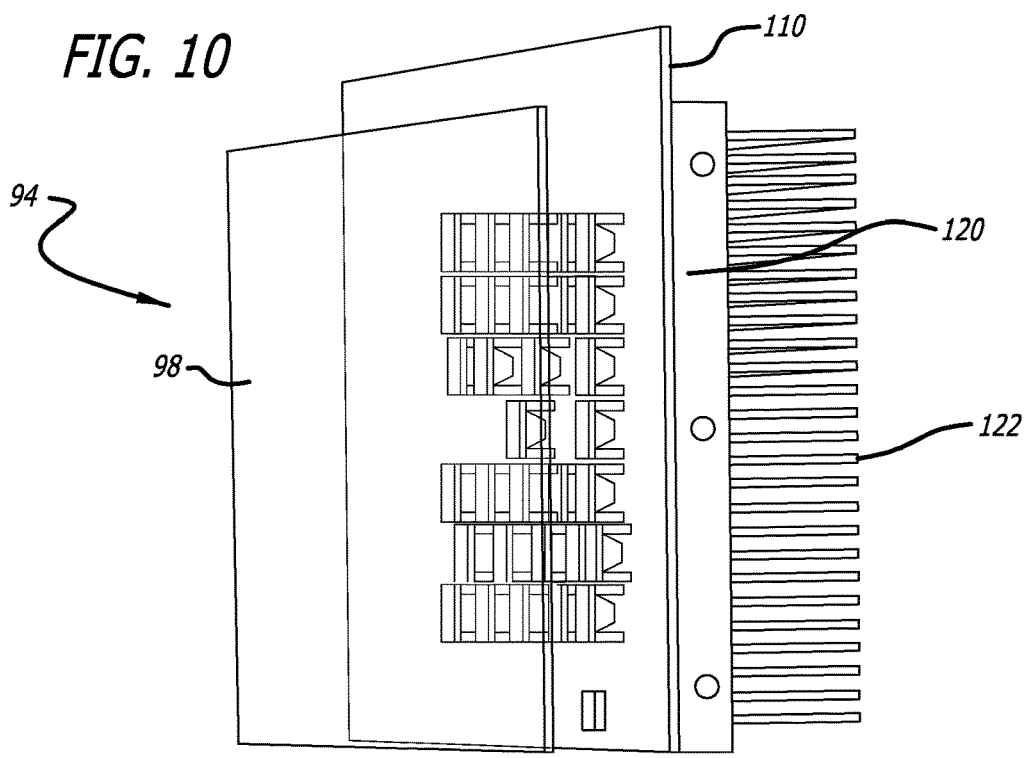
FIG. 10 shows a side view of LED arrays used in an embodiment of a LED light source used in a LED-based solar simulator system.
Figure 10:
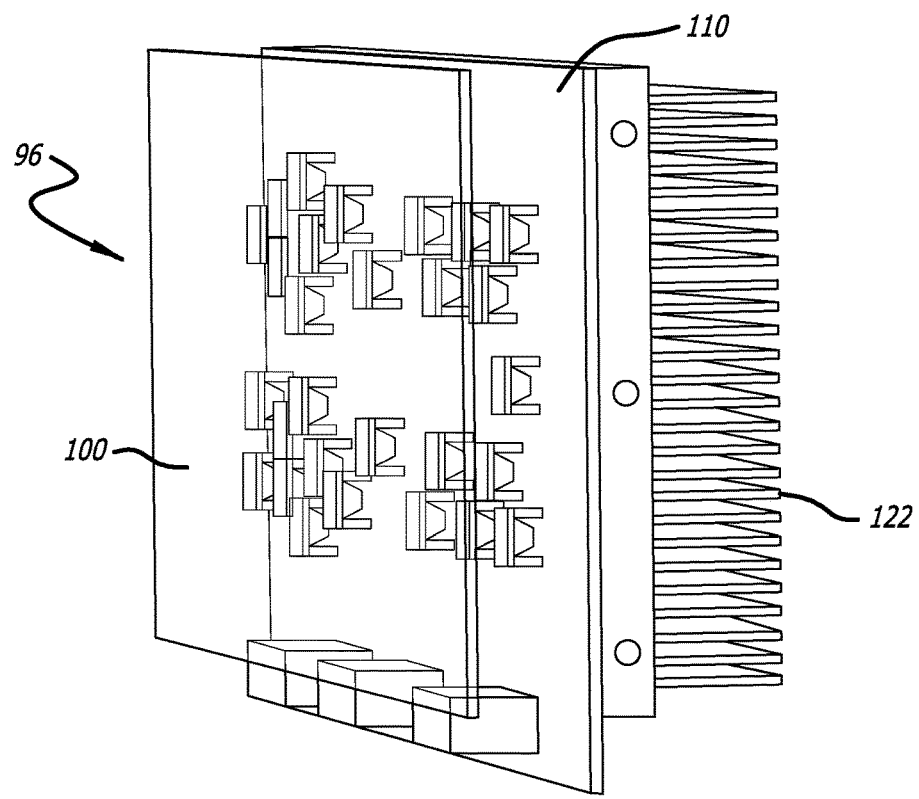
Figure 11:
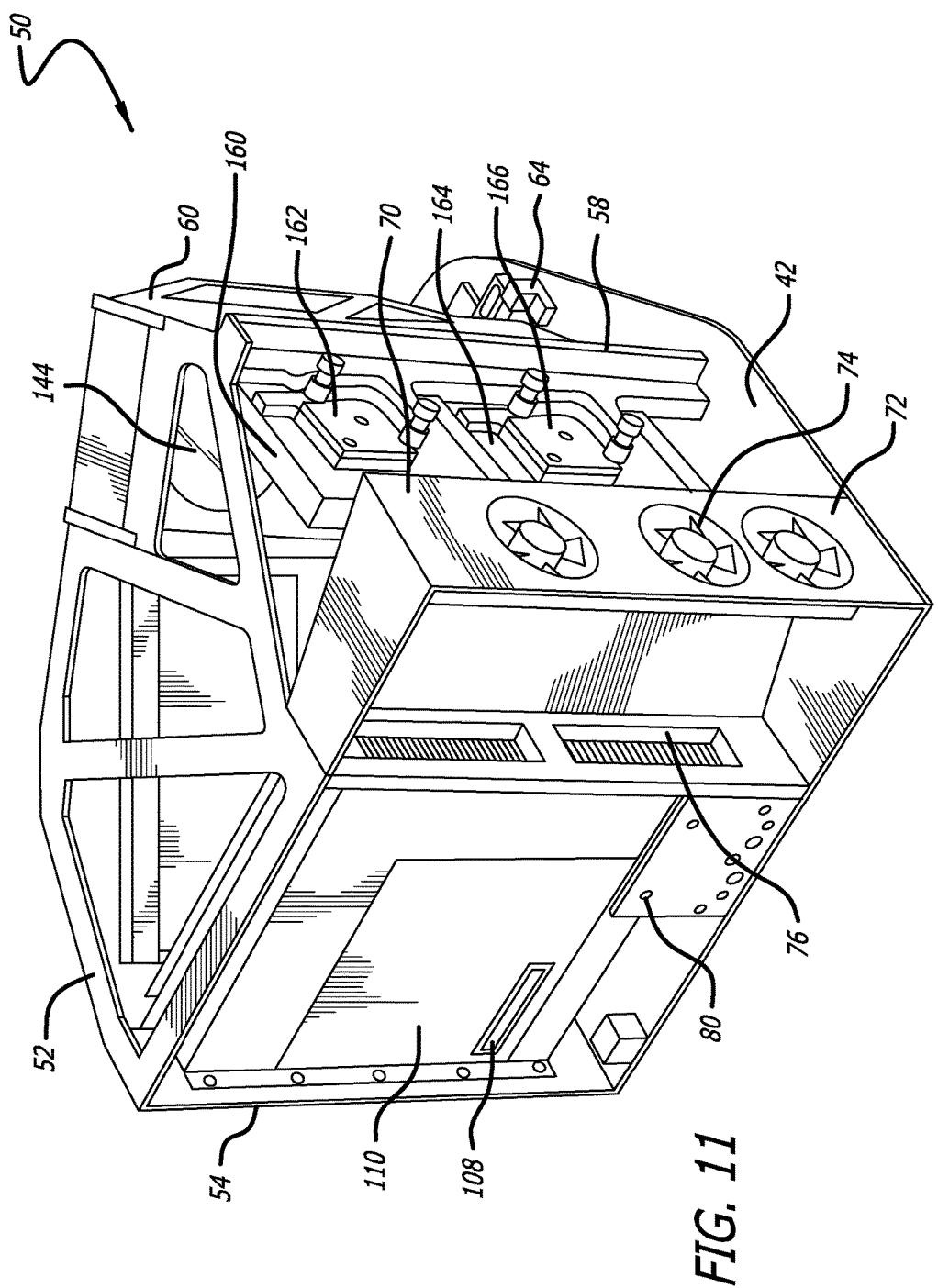
FIG. 11 shows another elevated perspective view of the internal components of an embodiment of a LED light source used in a LED-based solar simulator system.

FIGS. 6-11 show various views of the internal components forming the light source head 50 described above. As shown in FIGS. 6, 7, and 11, the light source head 50 includes a head frame or scaffold 52 configured to support the various components of the light source head 50. As such, the head frame 52 may be coupled to the head plate 42. Optionally, the head frame 52 may be integral to the head plate 42. In one embodiment, head frame 52 is manufactured from aluminum. In an alternate embodiment, the head frame 52 is manufactured from one or more alloys. Optionally, the head frame 52 and the various subsystems forming the head frame 52 may be manufactured from any variety of materials, including, without limitations, steel, aluminum, titanium, alloys, composite materials, thermoplastics, polymers, elastomers, ceramic materials, and the like.

Figure 8:
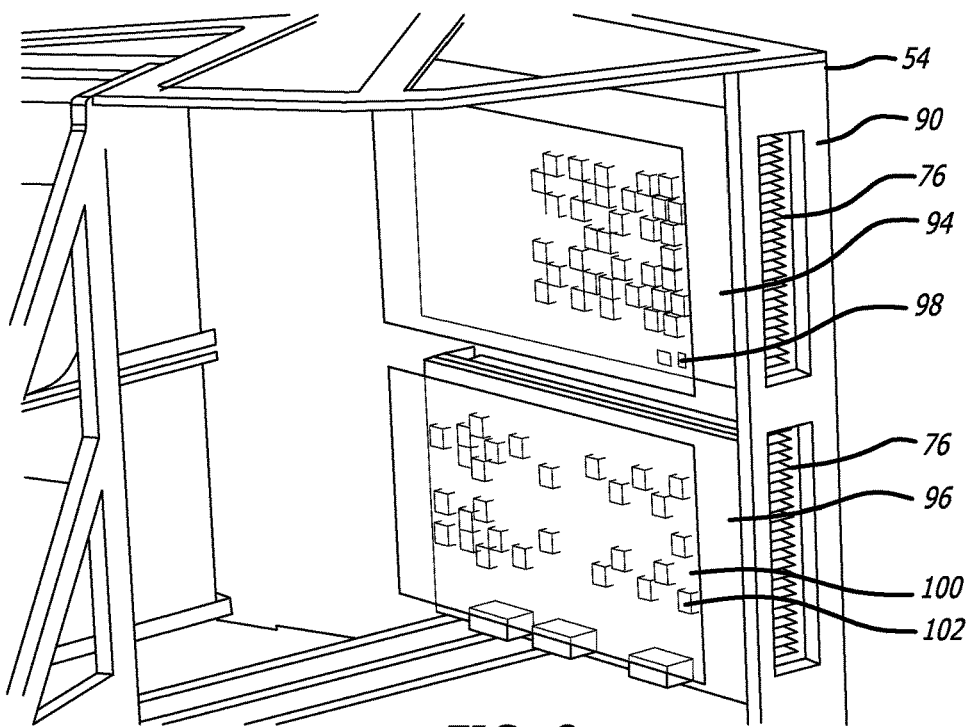
FIG. 8 shows an elevated side view of LED arrays used in an embodiment of a LED light source used in a LED-based solar simulator system.

Referring again to FIGS. 6-11, the head frame 52 may include various frame support systems configured to support the various subsystems forming the light source head 50. For example, the head frame 52 includes at least one LED array support 54 configured to support one or more LED arrays 94, 96 at a desired location. FIG. 8 shows the a first LED array 94 and at least a second LED array 96 coupled to or otherwise being supported by the LED array support 54 of the head frame 52. In an alternate embodiment, the LED array support 54 is configured to support three of more LED arrays. In another embodiment, the LED array support 54 is configured to support four or more LED arrays. Optionally, the LED array support 54 may be configured to support a single LED array. Those skilled in the art will appreciate that the LED array support 54 may be configured to support any number and size of LED arrays. In the illustrated embodiment, the LED array support 54 is configured to support the LED arrays 94, 96 at a fixed location. Optionally, the LED array support 54 may be configured to movably support the LED arrays 94, 96. As such, the LED array support 54 may include one or more movable stages, gimbals, kinematic devices, and the like thereby permitting the user to adjust the position of the LED arrays 94, 96 along any number of planes relative to head frame 52.

Referring again to FIGS. 6-11, the head frame 52 may include one or more mirror or reflector supports 56. The mirror support 56 may be configured to support one or more mirrors at any position relative to the LED arrays 94, 96. FIG. 6 shows an embodiment of a mirror support 56 having a first mirror 130 and second mirror 132 being supported by one or more mirror support 56. Those skilled in the art will appreciate that any number of mirrors may be supported by any number of mirror supports 56. In the illustrated embodiment shown in FIG. 6, at least one mirror mount 62 may be used to couple the mirrors 130, 132 to the mirror support 56. In one embodiment, the mirror mount 62 comprises an adjustable mirror mount 62 configured to permit multi-planar adjustment of at least one mirror coupled to the mirror mount 62. For example, in one embodiment, the mirror mounts 62 comprises kinematic mirror mounts permitting the user to precisely adjust the position of the mirrors supported by the mirror mounts 62. Optionally, the mirror mount 62 may be configured to position the mirrors 130, 132 in a fixed position. In the illustrated embodiment, the mirror support 56 is positioned proximate to the LED array support 54. Those skilled in the art will appreciate that the mirror support may be positioned distally from the LED array support 54.

As shown in FIGS. 6, 7, and 11, the head frame 52 may include one or more diffraction element supports 58. In the embodiment shown in FIGS. 6, 7, and 11, the diffraction element support 58 is configured to support at least one diffractive optical element at a desired location. In the illustrated embodiment, the diffractive optical element support 58 is shown supporting a first diffractive optical element 160 and a second optical diffractive element 164. In one embodiment, the diffractive optical elements 160, 164 comprise ruled echelle diffraction gratings. Optionally, any variety of reflective and/or transmissive diffractive optical elements may be used with the present system. Exemplary alternate diffractive optical elements include, without limitations, diffraction gratings, prisms, and the like. As shown, the diffractive optical elements may be coupled to the diffraction element support 58 via one or more diffraction element mounts. In the illustrated embodiment, the first diffractive optical element 160 is coupled to the diffraction element support 58 via a first diffractive element mount 162. Similarly, the second diffractive optical element 164 is coupled to the diffraction element support 58 via a second diffractive element mount 166. In one embodiment, the diffractive element mounts 162, 166 comprise adjustable mounts configured to permit multi-planar adjustment of at least one diffractive optical element coupled to the diffractive element mount 162, 166. For example, in one embodiment, the diffractive element mounts 162, 166 comprise kinematic mounts permitting the user to precisely adjust the position of the diffractive optical elements 160, 164 supported by the mounts 162, 166. In the illustrated embodiment, the diffractive element support 58 is positioned distally from the LED array support 54 and mirror support 56. Those skilled in the art will appreciate that the diffraction element support 58 may be positioned proximal to at least one of the LED array support 54 and mirror support 56.

As shown in FIGS. 6, 7, and 11, the head frame 52 further includes at least one optics suite support 60. As shown, the optics suite support 60 is configured to support one or more optical elements at a desired location. In illustrated embodiments, the optics suite coupled to the optics suite support 60 include numerous optical elements configured to condition an optical signal prior to outputting the optical signal to the work surface 24. (See FIGS. 1-4) For example, in the illustrated embodiment, the optics suite includes a first lens 144 and a second lens 146, although those skilled in the art will appreciate that the any number of lenses could be used in the present system.

Referring again to FIGS. 6, 7, and 11, a first output mirror 140 and a second output mirror 142 may be included in the optics suite. In one embodiment, the first and second mirrors 140, 142 comprise dichroic mirrors, wherein the first output mirror 140 is configured to reflect at least one optical signal within a first wavelength range while the second output mirror 142 is configured to reflect at least one optical signal within a second wavelength range. Optionally, the first and second wavelength range may or may not be overlapping ranges. In addition, one or more additional optical elements 148 may be included in the optics suite (See FIG. 11).

Exemplary additional optical elements include without limitations beam homogenizers, lenses, field flatteners, sensors, filters, waveplates, patterns, masks, templates, mirrors, and the like. Optionally, the additional optics elements 148 may be positioned proximate to the projection aperture 38 formed on the head plate 42 of the light head source 50. In one embodiment, at least one adjustable optical mount may be used to couple at least one element of the optics suite to the optics suite support 60. Optionally, the optical elements forming the optics suite may be coupled to the optics suite support 60 in a fixed position.

As shown in FIGS. 6, 7 and 11, at least one thermal control system 70 may be included within the light source head 50. As shown, in one embodiment, the thermal control system 70 may include at least one shroud 72 having one or more fans 74 in communication therewith. In the illustrated embodiment, three fans 74 are included in the thermal control system 70 although those skilled in the art will appreciate that any number of fans could be used. Further, the fans 74 and shroud 72 are configured to direct air across at least a portion of at least one LED array supported by the LED array support 52, thereby providing convection cooling to the LED arrays 94,96 (See FIG. 8). As such at least one cooling passage 76 may be formed in the light source head 50. FIGS. 6, 7, and 11 show various views of the light source head 50 having at least one cooling passage formed therein. Further, cooling passages 76 may be in fluid communication with at least one vents 32 formed on the light source head housing 20. (See FIGS. 2 and 4). In addition, the light source head 50 may include any variety of alternate thermal control devices, including, without limitations, chillers, piezo-coolers, water-cooling systems, and the like. Optionally, the light source head 50 may be manufactured without a thermal control system 70. In another embodiment, the thermal control system 70 may include at least one heating device therein, the heating device configured to pre-heat or heat the LED arrays 94, 96, and/or LED assemblies 102 to a desired temperature, thereby reducing or eliminating device warm up time and wavelength drift associated with thermal cycling of the LED arrays 94, 94, and/or LED assemblies 102 (See FIGS. 8-10).

FIGS. 7 and 11 show an embodiment of a light source head 50 having at least one mounting support bracket 80 coupled to or otherwise in communication with the head frame 52, the head plate 42, or both. The mounting bracket 80 is configured to enable the light source head 50 to securely couple to the coupling device 26, thereby permitting the securing the light source head 50 to the head support 22 (See FIGS. 1-5). As such, the mounting bracket 80 may include various mounting apertures configured to receive one or more fasteners therein.

FIGS. 8-10 show various detailed views of the LED arrays of the light source head 50. As shown, at least one LED arrays support body 90 is supporting the first LED array 94 and the second LED array 96. As stated above, any number of LED arrays may be used with the present system. Optionally, at least one cooling passage 76 may be formed in the LED array support body 90. The cooling passage 76 may be in fluid communication with the thermal control system 70 described above.

Referring to FIGS. 8-10, at least one field flattening device may be positioned proximate to at least one LED array. In the illustrated embodiment, a first field flattening device 98 is positioned proximate to the first LED array 94. Similarly, a second field flattening device 100 is positioned proximate to the second LED array 96. In one embodiment, the field flattening devices 98,100 comprise Fresnel lenses or bodies, although those skilled in the art will appreciate that at any variety of field flattening devices may be used. In one embodiment, at least one field flattening device 98, 100 comprises a Fresnel lens having a planar body. In an alternate embodiment, at least one field flattening device 98,100 comprises a Fresnel lens having an arcuate body. In another embodiment, at least one field flattening device 98,100 comprises a holographic Fresnel lens. In yet another embodiment, at least one field flattening device 98,100 comprises at least one fiber optic-based Fresnel lens.

As shown in FIGS. 8-10, the LED arrays 94, 96 may comprise one or more LEDS devices configured to output an optical signal having a wavelength of about 200 nm to about 2000 nm. In one embodiment, the LED arrays comprise a mixture of light emitting diode groups (hereinafter LED groups), each LED group configured to output a discrete wavelength range. For example, a first LED group would be configured to output an optical signal having a wavelength of about 350 nm to about 400 nm, while a second LED group would be configured to output an optical signal having a wavelength of about 400 nm to about 450 nm. As such, n number of LED groups, each configured to output a optical signal within a discrete spectral range, may be cooperatively output an optical signal having a spectral range from about 200 nm to about 2000 nm. As shown, each LED group consists of one or more LED assemblies 102 positioned on at least one printed circuit board or substrate 110. In one embodiment, each LED assembly 102 comprises at least one LED device or die 112 having at least one total internal reflection lens 114 (hereinafter TIR lens) coupled thereon or positioned proximate thereto. In the illustrated embodiment, the TIR lens 114 may include at least one TIR lens support 116 coupled to the circuit board 110. In the illustrated embodiment, the LED arrays utilize LEDs are individual light sources. Optionally, laser light emitting diodes may also be used in addition to or in the alternative to LEDs.

FIG. 10 shows a side perspective view of the first and second LED arrays 94, 96. As shown, at least one circuit board 110 of the LED arrays 94, 96 may be in communication with at least one PCB support body 120. In one embodiment, the PCB support body 120 is configured to support the circuit boards 110 and enhance convection cooling of the LED arrays. As such, the PCB support body 120 may include one or more extensions 122 configured to increase the surface area of the support body 120 and improve thermal exchange. As such, the support body 120 may be manufactured from any variety of materials, including, without limitations, aluminum, copper, tungsten, metal alloys, and the like.

Referring again to FIGS. 1, 6, 7, and 11, at least one alignment device 64 may be positioned on the head plate 42 proximate to at least one alignment aperture 36 (See FIG. 5) formed therein. During use, the alignment devices 64 emit at least one alignment signal 34 which is irradiated through the alignment aperture 36 to the work surface 24. In one embodiment, two alignment devices 64 are each used to project an alignment signal 34 at an angle to the work surface 24, as shown in FIG. 1. The angle of the two alignment signals 34 may be configured to permit the repeatable positioning of the light source 12 at a desired height from the work surface 24. For example, the user may set the angle of the alignment devices 64 for a desired height (e.g. 12 inches). Thereafter, the alignment devices 64 are activated and produce two separate signals 34 on the work surface 24. Thereafter, the user repositions (i.e. raises and lowers) the light source 12 on the head support 22 such that a single alignment signal 34 appears on the work surface 24, thereby ensuring that the light source 12 is at the desired height from the work surface 24.

Figure 12:
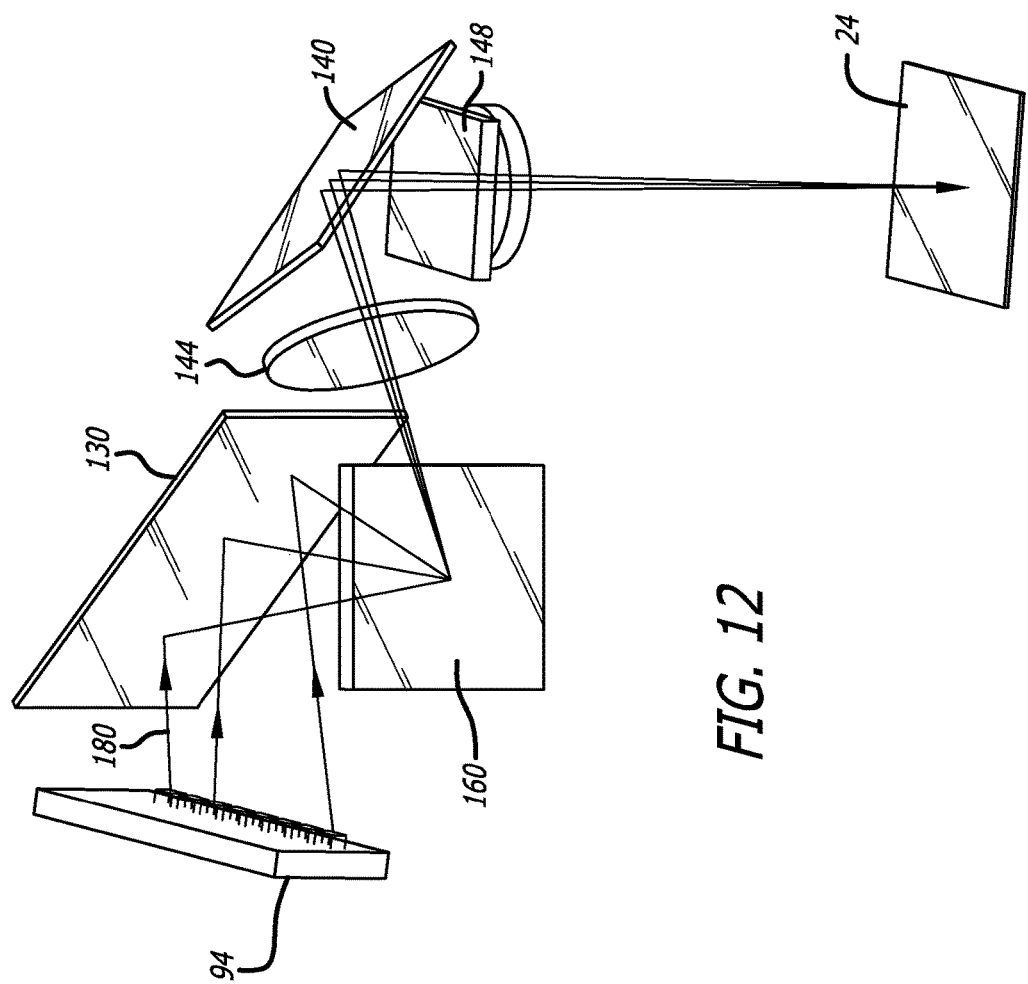
FIG. 12 shows a ray trace of an optical signal emitted by a LED array traversing through an embodiment of a LED light source used in a LED-based solar simulator system.

FIG. 12 shows an optical signal traversing at least a portion of the light source head 50 (See FIG. 6). For example, as shown, the first LED array 94 emits at least one optical signal 180 comprised of the output of individual LED groups each having a discrete wavelength range to the first mirror 130 which directs the optical signal 180 to the first diffractive optical element 160. The diffractive element 160 is used to combine the discrete optical signals from the individual LED groups formed on the first LED array 94 to generate a broad spectrum output signal which is directed through the lens 144 to the mirror 140 (e.g. dichroic mirror) which reflects the signal 180 through the optical element 148 (e.g. beam homogenizer and/or lens) to the work surface 24. Unlike prior art LED-based solar simulators, the present system uses at least one diffractive element 160 to spectrally combine the discrete spectral outputs of the individual LED groups to form a broad spectral output at the work surface 24.

Figure 13:
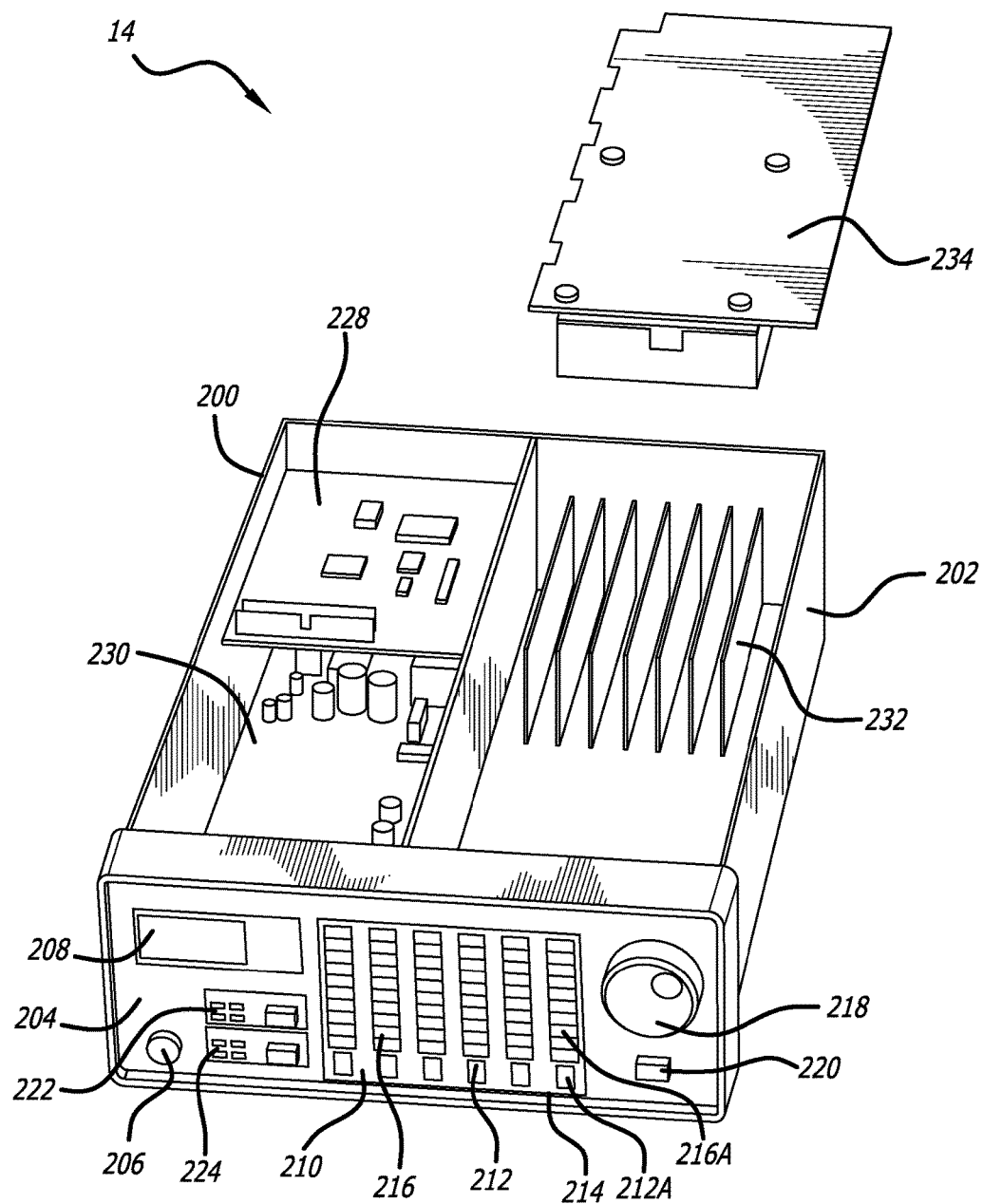
FIG. 13 shows an elevated perspective view of the internal components of a control device used in an LED-based solar simulator system.

FIG. 13 shows a perspective view of the control device 14 shown in FIG. 1. As shown, the control device 14 includes a control device body 200 comprised of at least one component enclosure 202 having at least one user interface 204 coupled thereto. The user interface 204 may include at least one user actuator, switch, or information display thereon. For example, in the illustrated embodiment, the user interface 204 includes a power button 206 and at least one information and/or alpha-numeric display 208, although those skilled in the art will appreciate that any number or buttons, switches, displays, and the like may be included on the control device 14. For example, in one embodiment, the information display 208 may be configured to display a numeric value of kW/m$^2$, although those skilled in the art will appreciate that the information display 208 may be configured to display any variety of information. In an alternate embodiment, the information display 208 comprises a LED display. In another embodiment, the information display 208 comprises a LCD display. Optionally, the information display 208 may comprise a touchscreen device. In short, any variety of displays may be used with the control device 204.

Referring again to FIG. 13, the control device 14 may include at least one spectrum control system 210 thereon. For example, in the illustrated embodiment, the spectrum control system 210 includes one or more discrete wavelength range power control actuator 212, discrete wavelength power designators 214, and discrete wavelength range power indicators 216 thereon. For example, in one embodiment a first wavelength range power control actuator 212A and first wavelength range power indicator 216A, in cooperation with the wavelength range actuator 218, may be configured to selectively vary the output power/intensity of the corresponding LED wavelength group positioned on the first and second LED arrays 94, 96 of the light source head 50 (See Paragraph [0028], FIGS. 7-10), thereby permitting the user to selectively vary the spectral characteristics of the output of the LED light source 12 (See FIG. 1).

As shown in FIG. 13, the wavelength spectrum control system 210 may include one or more wavelength range actuators 218 and wavelength range actuator control 220 thereon. The wavelength range actuator 218 may be configured to permit the user to adjust the power/intensity within a desired wavelength range, in cooperation with wavelength range power controls 212 and wavelength range power indicators 216. For example, during use, the user may actuate the first wavelength range power control actuator 212A thereby permitting a variation of the power/intensity of the output signal of the LED light source 12 within the wavelength range denoted by the first wavelength power designator 214A. Thereafter, the user may actuate the wavelength range actuators 218 to increase or decrease the spectral characteristics of the of the output from the LED light source 12 (See FIG. 1) within the wavelength range denoted by the first wavelength power designator 214A. The change in output power/intensity within the desired wavelength range is illustrated by the wavelength range power indicator 216A corresponding to the first wavelength power designator 214A. Once the desired wavelength spectrum is achieved the user may actuate the first wavelength range power control 212A to prevent further variation of the output wavelength spectrum.

Referring again to FIG. 13, at least one wavelength range actuator control 220 may be included on the control device 14. In one embodiment, the wavelength range actuator control 220 is configured to provide any variety of functions. In one embodiment, the wavelength range actuator control 220 acts as a master control for the wavelength range actuators 218, permitting or restricting the capability of the wavelength range actuators 218 to vary power/intensity setting of the control device 14. In another embodiment, the wavelength range actuator control 220 may be configured to operate as a scaling function for the input from the wavelength range actuators 218. For example, the wavelength range actuators 218 and un-actuated wavelength range actuator control 220 may be configured to permit selective control of the output power/intensity by the tens (10s) of Watts, while the wavelength range actuators 218 and actuated wavelength range actuator control 220 may be configured to permit selective control of the output power/intensity by the hundreds (100s) of Watts. In another embodiment, the wavelength range actuators 218 and wavelength range actuator control 220 may permit the user to scroll through various pre-loaded or saved wavelength spectra stored within a memory device located within the control device 14.

As shown in FIG. 13, the control device 14 may optionally include one or more additional actuators, displays, and the like. For example, in the illustrated embodiment, the control device 14 includes at least one intensity calibration actuator 222 and at least one spectrum actuator 224. Like the wavelength range actuator control 220 described above the intensity calibration actuator 222 and spectrum actuator 224 permit the user to tailor the output wavelength spectrum and intensity based on user input via the wavelength range actuators 218 or, in the alternative, select from any number of pre-loaded or saved output profiles save within the control device 14 of an external storage device (not shown) in communication with the control device 14.

Referring again to FIG. 13, at least one control circuit and power supply is positioned within the component enclosure 202 of the control device body 200. In one embodiment, at least one microcontroller 228 and at least one power supply 230 is positioned therein. The microcontroller 228 receives and transmits input from the user via the various components forming the user interface 204 and controls the operation of the LED light source in response thereto. Similarly, the microcontroller 228 receives and transmits data from the LED light source and transmits data to the user. Further, the microcontroller 228 may include at least one storage device therein, thereby permitting the user to store data thereon. Further, the microcontroller 228 may be configured to communicate with one or more external processors, computers, networks, memory devices, and the like via a conduit, wirelessly, or both. In one embodiment, the power supply 230 is configured to provide power to at least one of the LED light source 12, control device 14, or both. Optionally, the power supply 230 may comprise an AC power supply, a DC power supply, an A-D converter, or the like.

As shown in FIG. 13, one or more LED array control boards 232 may be positioned within the component enclosure 202 of the control device body 200. The LED array control boards 232 are in communication with the microcontroller 228 and at least one LED group formed on the LED arrays 94, 96 (See FIGS. 8-10), permitting the user to control the output of specific LED groups formed on the LED arrays 94, 96 to vary the output wavelength spectrum. For example, on one embodiment, each LED control board 232 includes one or more control circuits configured to control the output of specific LED groups formed on the LED arrays 94, 96 to vary the spectral characteristics, power, brightness, intensity, and the like of the output signal form the LED light source 12 (See FIG. 1). In one embodiment, LED control board 232 varies the voltage or current delivered specific LED groups formed on the LED arrays 94, 96 in response to at least one command delivered to the LED control board 232 from the microprocessor 228. Optionally, any number of LED array control boards 232 may be included within the component enclosure 202 of the control device body 200. Further, at least one additional device 234 may be included within the component enclosure 202 of the control device body 200. For example, in one embodiment, the additional device comprises a power supply. In another embodiment, the additional device comprises a wireless communication device thereby permitting the control device 14 to wirelessly communicate with at least one of the LED light source 12, an external computer or processor (not shown), or both. Further, the additional device 234 may comprise a storage device permitting the user to save and/or access at least one library of data on the control device 14.

The embodiments disclosed herein are illustrative of the principles of the invention. Other modifications may be employed which are within the scope of the invention. Accordingly, the devices disclosed in the present application are not limited to that precisely as shown and described herein.

What is claimed is:

1. A method of reproducing the solar spectrum, comprising:
   providing at least one LED-based light source formed from at least one LED array comprising multiple LED groups of LED assemblies;
   activating at least one of the LED groups to output at least one output optical signal within a discrete wavelength range;
   combining the output optical signals from the multiple LED groups to produce at least one broad spectrum output signal using at least one diffractive element;
   selectively varying at least one characteristic of the broad spectrum output signal and directing the broad spectrum output signal to at least one work surface;
   illuminating the at least one work surface with at least two alignment light signals outputted by at least two alignment devices positioned on the LED light source, the alignment light signals configured to intersect at an angle; and
   adjusting the position of the LED light source until the alignment light signals intersect when the LED light source is located at a desired distance from the work surface.

2. The method of claim 1 further comprising selectively varying the power of the at least one output optical signal outputted by the LED groups within each LED array.

3. The method of claim 1 further comprising selectively varying the intensity of the at least one output optical signal outputted by the LED groups within each LED array.

4. The method of claim 1 further comprising controlling the power of the at least one broad spectrum output signal by actuating at least one wavelength range power control actuator.

5. The method of claim 1 further comprising controlling the intensity of the at least one broad spectrum output signal by actuating at least one wavelength range power control actuator.

6. The method of claim 1 further comprising controlling the at least one broad spectrum output signal with at least one wavelength spectrum control system.

7. The method of claim 4 further comprising displaying the optical power of the broad spectrum output signal on at least one wavelength power designator.

8. The method of claim 1 further comprising varying at least one characteristic of the at least one broad spectrum output signal using at least one microprocessor, the microprocessor in communication with at least one control device, the at least one control device in communication with at least one of the LED groups of LED assemblies.

9. A method of reproducing the spectral characteristics of the sun, comprising:
   providing at least one LED-based light source formed from at least one LED array comprising multiple LED groups of LED assemblies;
   activating at least one of the LED groups to output at least one output optical signal within a discrete wavelength range;
   selectively controlling the output of at least one LED group with at least one control device in communication with the at least one LED-based light source, thereby selectively varying the wavelength spectra of the at least one output optical signal;
   illuminating at least one work surface with at least two alignment signals outputted by at least two alignment devices positioned on the at least one LED light source, the at least two alignment light signals configured to intersect at an angle; and
   adjusting the position of the at least one LED light source until the at least two alignment light signals intersect when the at least one LED light source is located at a desired distance from the at least one work surface.

10. The method of claim 9 wherein the at least one control device communicates with the at least one LED-based light source via at least one conduit.

11. The method of claim 9 wherein the at least one control device communicates with the at least one LED-based light source wirelessly.

12. The method of claim 9 further comprising operating the at least one control device with at least one spectrum control system by selectively varying the power of at least one output optical signal emitted from at least one LED group of at least one LED assembly of the at least one LED array by actuating at least one wavelength range power control actuator;
   identifying at least one wavelength of the at least one output optical signal emitted from at least one LED group of the LED assemblies by displaying the at least one wavelength on at least one wavelength power designator; and
   displaying the power of the at least one output optical signal emitted from at least one LED group of the LED assembly on at least one wavelength range power indicator.

13. The method of claim 12 further comprising displaying the output power of the at least one LED-based light source with at least one information display.

14. The method of claim 9 further comprising powering the at least one control device and the LED groups of the LED assemblies of the at least one LED array with at least one power supply;
   controlling the at least one power supply with at least one microprocessor; and
   permitting the user to vary at least one current signal delivered to the LED groups based on commands from the at least one microprocessor via at least one LED array control board in communication with at least one of the at least one power supply and at least one LED group.

15. The method of claim 14 further comprising permitting the user to vary the current signal delivered to the LED group by the LED control board through at least one user interface.

16. The method of claim 14 further comprising permitting the user to communicate with the at least one microprocessor through at least one external processor.

17. The method of claim 14 further comprising permitting the user to store data on one or more memory devices.

18. The method of claim 9 further comprising providing at least one spectrum control system in the at least one control device, the at least one spectrum control system permitting the user to actuate at least one wavelength power control actuator, thereby selectively permitting the variation of the intensity of the at least one output optical signal emitted from at least one LED group of LED assemblies of the at least one LED array;
   identifying the wavelength of the at least one output optical signal emitted from at least one LED group of the LED assemblies with at least one wavelength power designator;
   displaying the output power of the at least one output optical signal emitted from at least one LED group of the LED assemblies on at least one wavelength range power indicator, within at least one wavelength range designated by the wavelength power designator; and
   permitting the user to vary the power of the at least one output optical signal emitted from at least one LED group of the LED assemblies by actuating at least one wavelength range actuator within the wavelength range designated by the at least one wavelength power designator as selected by the at least one wavelength power control actuator.

* * * * *